April 6, 1965 W. O. JONES ETAL 3,176,564
FLYING SHEAR APPARATUS
Filed Aug. 3, 1962 3 Sheets-Sheet 1

INVENTORS
WALTER O. JONES &
IRVIN M. PITCHFORD

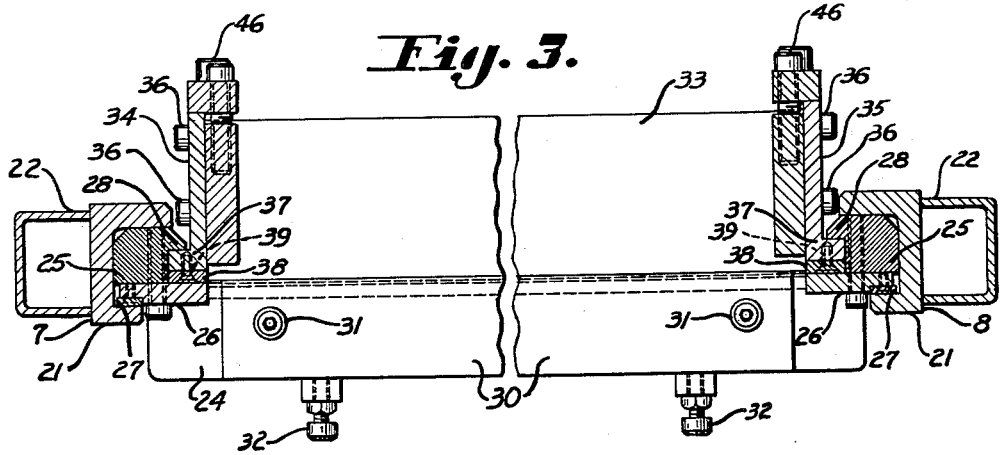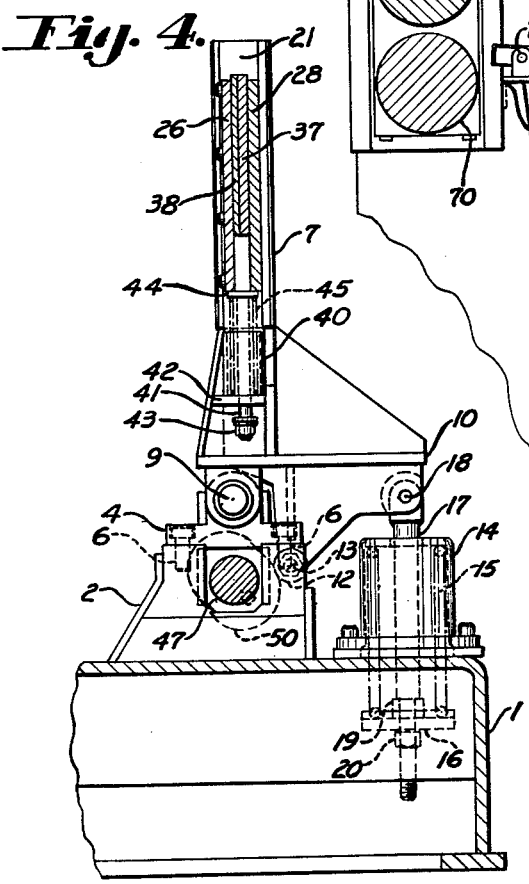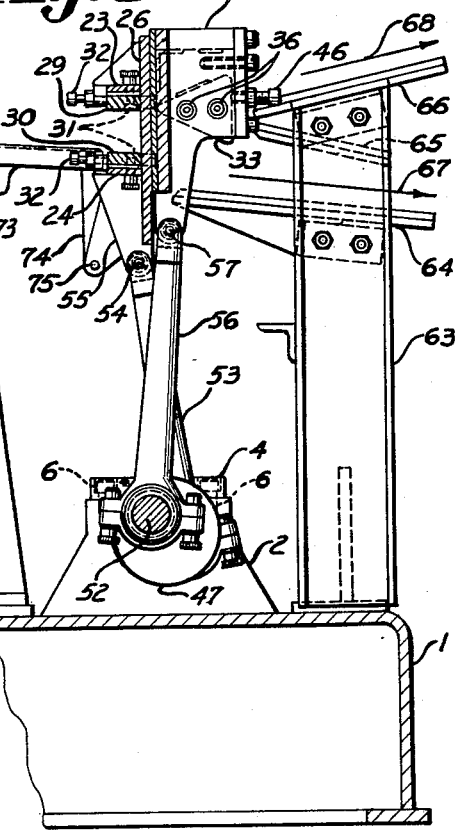

April 6, 1965 W. O. JONES ETAL 3,176,564
FLYING SHEAR APPARATUS
Filed Aug. 3, 1962 3 Sheets-Sheet 3

INVENTORS
WALTER O. JONES &
IRVIN M. PITCHFORD their Attorneys

United States Patent Office 3,176,564
Patented Apr. 6, 1965

3,176,564
FLYING SHEAR APPARATUS
Walter O. Jones, Boca Raton, Fla., and Irvin M. Pitchford, Howland Township, Trumbull County, Ohio, assignors to The Wean Engineering Company, Inc., Warren, Ohio
Filed Aug. 3, 1962, Ser. No. 216,270
9 Claims. (Cl. 83—314)

This application is a continuation in part of our copending application Serial No. 141,373, filed September 28, 1961, now abandoned.

This invention relates to flying shears and is particularly useful in shearing extended stock such as tin plate and the like.

The use of shearing apparatus for the cutting of metallic stock is, of course, well known, and numerous types of stationary and flying shears have been developed. Stationary shears require, of course, that the stock be at rest before it is cut. Flying shears have been developed to cut the stock while it is moving thereby eliminating stoppage of the stock and the apparatus through which it is passing. While numerous flying shears have been developed which will operate at high speeds, they have ordinarily been designed for the purpose of continuous operation at sustained high speeds, are of great complexity, and are, therefore, quite expensive. In many instances, a shear is required for the purpose of making occasional cuts as, for example, when continuous stock being fed through a continuous processing line is periodically cut so that it can be kept in manageable lengths. It is, for example, a common practice to wind metallic strip from a processing line on a mandrel and then to cut the strip and commence winding upon a second mandrel after a coil of convenient length is wound upon the first mandrel. In some cases, several miles of strip may be conveniently wound in one coil. While a new coil is wound upon the second mandrel, the coil upon the first mandrel is restrained by banding and is then removed so that a further coil may again be wound thereon after a full coil is wound on the second mandrel. A flying shear designed for the purpose of cutting the strip in this fashion must be rugged, relatively inexpensive, and have a high speed to avoid reducing the line speed when the shear is operated. Such a shear must be further capable of a high rate of acceleration since it must accelerate to speed, cut once, and then stop without making any cuts except the single operating cut. In other words, it cannot be brought up to speed while operating through several cycles and have stock fed into it after it has attained its operating speed. The type of high speed flying shear employed for continuous shearing is too expensive for the purposes of making single cuts and ordinarily has too great an inertia to accelerate, cut, and stop within a single operating cycle.

Heretofore, flying shears designed for such intermittent use has operated at a relatively slow speed. That has required that the processing line not exceed a relatively slow linear speed at the time of shearing. As the speed of processing lines has increased, it has become necessary to reduce the speed of the line to a proportionally lower speed each time the shear is operated. We have invented new and useful flying shear apparatus which obviates these and other difficulties of previous shears and which is operable at significantaly higher speeds than flying shears heretofore available for intermittent duty.

We provide a base with shear frame means pivotally mounted on the base and reciprocable back and forth on the pivot. We provide means controlling movement of the frame back and forth on the pivot. We preferably provide means in fixed controlling relationship to the frame to control movement of it and operable to move the frame means back and forth on the pivot. We preferably provide link means pivotally connected to said frame for controlling movement of said frame, and preferably connect said link means to crank means. We provide means urging the frame in one direction and means opposing said urging. We sometimes provide yielding means such as spring means urging the frame means in one direction and provide cam means which variably oppose the movement of the frame means. We further provide a plurality of knife means mounted in the frame means and reciprocable within the frame means. We preferably employ cam means which control the knife means for sliding movement within the frame. We preferably employ sliding movement of the knife means relative to the frame and to other of the knife means. We further preferably drive all said cam means by one operating means such as a cam shaft and prefer to drive the shear means with a single motor whereby all the moving parts are maintained in coordinated relationship and the knife means are operated concurrently with flying movement of the shear frame. We preferably provide multiple knife means having at least two spaced apart knives and second knife means which register with said multiple knife means. We further preferably reciprocate the multiple knife means and the second knife means causing the multiple knife means and the second knife means to register and to cut stock passing between the multiple knife means. We further preferably provide deflector means associated with the knife means and positioned to direct strip issuing from the shear along a strip pass line. We further preferably provide guide means defining a plurality of strip pass lines along which strip may issue from the shears.

Other details, objects, and advantages of our invention will become apparent as the following description of a present preferred embodiment thereof proceeds.

In the accompanying drawings, we have illustrated a present preferred embodiment of our invention in which:

FIGURE 3 is a sectional view taken along line III—III of FIGURE 1;

FIGURE 4 is a sectional view taken along line IV—IV of FIGURE 1;

FIGURE 5 is a sectional view taken along line V—V of FIGURE 1; and

Figure 2:
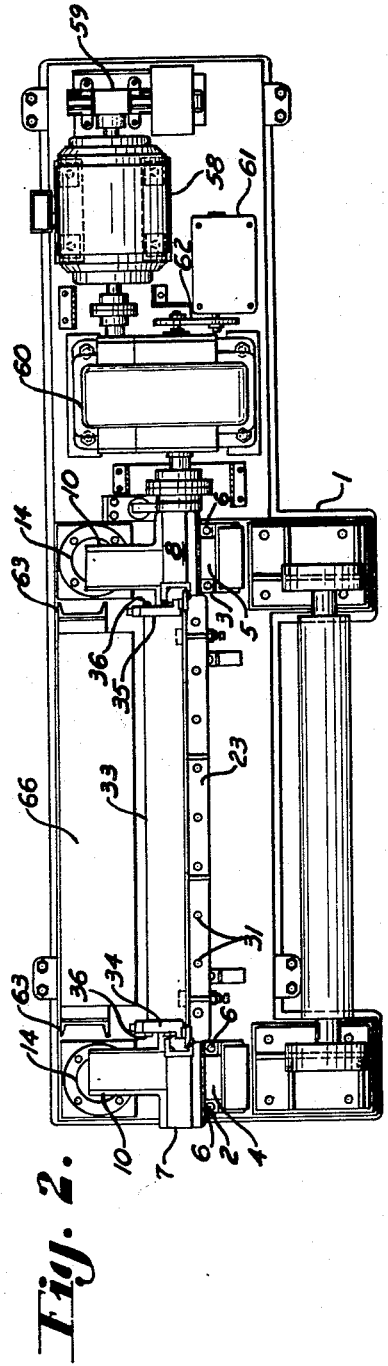
FIGURE 2 is a plan view of the apparatus shown in FIGURE 1.
Figure 1:
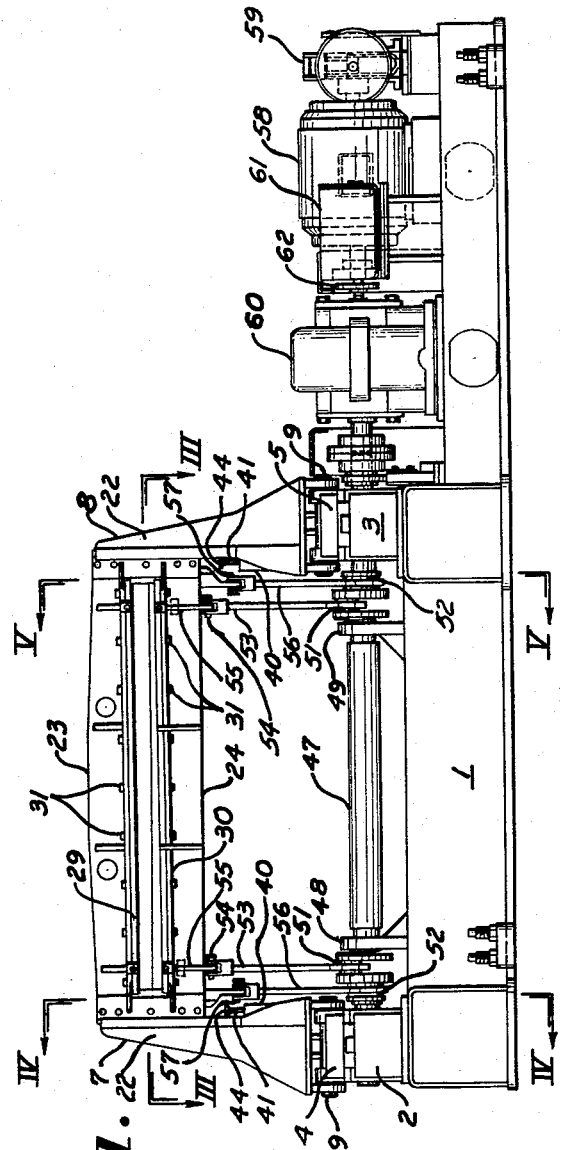
FIGURE 1 is a side elevational view of a shear employing our invention.

The shear apparatus is mounted upon a base 1 which rests upon the floor of the mill in which the shear is installed and which supports the entire shear mechanism. A pair of pedestals 2 and 3 are mounted on base 1 and carry the reciprocating or flying shear frame. Trunnion blocks 4 and 5 are rigidly bolted to pedestals 2 and 3 respectively by a plurality of bolts 6. Paired upright frame members 7 and 8 are pivotally connected to trunnion blocks 4 and 5, respectively, each by a pivot pin 9. Frame members 7 and 8 effectively constitute a shear frame positioned on base 1 extending transversely across the direction of travel of the stock which is to be cut, and pivoted for reciprocating movement about the pivotal axis. The reciprocating movement is generally in the axis of travel of the stock passing through the shear. The stock, which may be a thin cold rolled metal strip such as electrolytic tin plate, passes from left to right as viewed in FIGURES 4 and 5 of the drawings.

Each of the frame members 7 and 8 has an arm 10 formed of parallel spaced members projecting in the direction of strip travel from the plane of the shear frame comprising frame members 7 and 8. A cam follower comprising a roller 12 and axle 13 extending between the plates of arm 10 is attached to arm 10. Two inverted cups 14 are bolted to base 1, one beneath the end of each arm 10. A coil spring 15 is fitted within each of the cups 14 and extends between cup 14 and a pad 16 positioned below spring 15. A rod 17 is pivotally connected to each of the arms 10 at a pivot pin 18 extending between spaced members of arm 10 and passes through a hole in cup 14, through the center of coil spring 15, and through a hole in pad 16. Each of the rods 17 is threaded at its lower end, and pad 16 is fastened in place by nuts 19 and 20 threaded onto each rod 17 above and below the associated pad 16. The nuts are adjusted to compress the springs when the shear frame is in normal position, the nuts being adjusted to produce an equal loading on the two springs 15.

The upper portion of each frame member 7 and 8 is formed of a channel shaped member 21 having a box stiffening member 22 welded thereto on the outward side of member 21 away from the path of strip travel. A multiple knife support member is fitted within the channel members 21 of frame members 7 and 8 and is vertically movable therein. The knife support member comprises an upper cross bar 23 and a lower cross bar 24 which are maintained in fixed relationship by vertical members extending between and fixed to the ends of the upper and lower cross bars. Each of vertical members comprises a guide 25 to which a retainer plate 26 is bolted. Each guide 25 is bolted to the upper and lower cross bars. A bearing strip 27 is attached to each of the retainer plates 26. Each vertical member comprising guide 25, retainer plate 26, and bearing strip 27 is confined within the arms of channel shaped member 21. Each guide 25 has a vertically extending lip 28 machined on its inner face, the lip thereby extending toward the strip pass line.

Two flat knives 29 and 30 are bolted to the upper and lower cross bars 23 and 24 respectively by screws 31. It will be appreciated that each of knives 29 and 30 could, if desired, be formed of a series of sections. The point is that they form two continuous spaced apart knives regardless of the number of sections from which they are formed. By reason of the fact that they are bolted to the upper and lower cross bars, knives 29 and 30 are maintained in a fixed spaced-apart parallel relationship. Knives 29 and 30 have slotted holes through which screws 31 extend. The knives are adjusted horizontally by turning adjusting screws 32 which are threaded into the cross bars, and which bear against the knives.

A deflector 33 extending from side to side of the shear frame and having a triangular cross section is bolted to carriers 34 and 35 by bolts 36. An edge of the deflector faces the direction in which strip approaches the shear and a face of the deflector faces the direction in which strip passes from the shear. A knife is fitted in the upstream edge of the deflector. The entire deflector 33 may be made of tool steel or a tool steel insert may be fitted in it. The knife edge of deflector 33 is fitted in cutting relationship with knives 29 and 30. Deflector 33 and its knife are adjusted horizontally by adjusting screws 36. Carriers 34 and 35 have vertically extending offset lips 37 to which bearing strips 38 are fastened by screws 39. Lips 37 and bearing strips 38 are restrained between lips 28 and plates 26 and are vertically slidable relative thereto.

A cylindrical tube 40 is welded to each of the frame members 7 and 8 at its lower end. A rod 41 is fitted therethrough and through a hole in a cross member 42 welded to tube 40. A nut 43 is threaded on the lower end of rod 41 and a pad 44 is attached to the upper end. A coiled spring 45 is compressed between pad 44 and cross member 42.

A crankshaft 47 is positioned horizontally above base 1. It is journaled in bearings set within pedestals 2 and 3 and in bearing blocks 48 and 49 which are welded to the base 1. A shear frame cam 50 is fitted on the crank shaft 47 within each of the pedestals and engages roller 12 on the associated shear frame member 7 or 8. The crank shaft also has a pair of double knife cams 51 and a pair of single knife cams 52 in the form of throws or cranks on the cam shaft. Two connecting rods 53 are fitted on the double knife cams 51. Their other ends are connected by pivots 54 to brackets 55 welded to lower cross bar 24. A pair of connecting rods 56 is journaled on cams 52. Their free ends are pivotally connected by pivots 57 to carriers 34 and 35.

An electric motor 58 is mounted upon base 1 and is equipped with a brake 59. Motor 58 drives crankshaft 47 through a gear reducer 60 and associated couplings. A limit switch 61 employed to control operation of the shear is likewise driven through gear reducer 60 by a timing belt 62.

A pair of channels 63 are welded in upright position from base 1. They carry strip guides 64, 65 and 66. A lower strip pass line 67 extending from the shear is defined by guides 64 and 65 and an upper strip pass line 68 above guide 66 is defined by it. Pass lines 67 and 68 lead to a pair of mandrels upon which strip may be alternately coiled. Additional guide members may be employed between guide members 64, 65 and 66 and the mandrels.

A pair of pinch rolls 69 and 70 are mounted on the approach side of the shear. An approach strip guide 71 is pivoted at 72 to the pinch roll support at 73. Guide 71 is also pivoted to link 74 which is pivoted to the lower cross bar 24 at 75.

Cam 50 has two high points and two low points around its circumference and as it makes a complete revolution it will twice push against roller 12 to cause the shear frame to move on its pivot against springs 15. In half a revolution of cam 50, the shear frame will swing and then return to the position it previously occupied. Accordingly, one revolution of cam 50 (and of crankshaft 47) will operate the shear frame through two cycles. One complete revolution of crankshaft 47 will, however, operate the shear knives through one complete cycle. For that cycle, the knife of deflector 33 will engage both knife 29 and knife 30.

Figure 6:
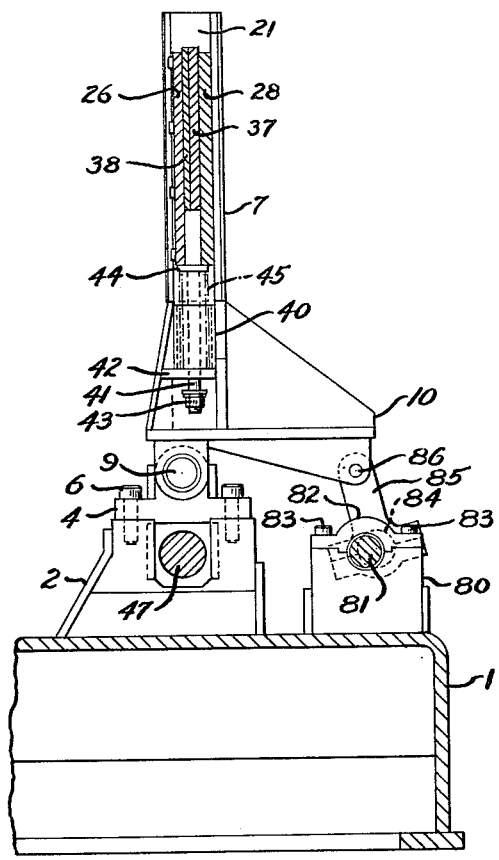
FIGURE 6 is a sectional view showing an alternate form of the invention corresponding to FIGURE 4.

In an alternate form of the invention shown in FIGURE 6, a cam in the form of a crank, and a link are employed to reciprocate the frame back and forth. FIGURE 6 is similar to FIGURE 4 and like numbers are used to designate like parts. A trunnion block 80 is mounted on each end of base 1 and carries a crankshaft 81 which is held in place by flaring caps 82 which are secured to trunnion blocks 80 by cap screws 83. Crankshaft 81 is connected to and driven with crankshaft 47 through a gear train of conventional design which has been omitted from the drawings for purpose of clarity. Two crank throws 84 are formed on crankshaft 81, one throw being at each end of the crankshaft. A link 85 is journaled on each crank throw 84 and is pivotally connected to arm 10 by a pivot pin 86. It will be apparent from an inspection of FIGURE 6 that the crankshaft and link mechanism replaces the springs 15, cams 50, and associated apparatus shown in FIGURE 4. The arrangement of FIGURE 6 is advantageous where high accelerations and high inertia of the shear mechanism are encountered, since under certain conditions cam follower 12 may float away from contact with cam 50.

In the operation of the shear, incoming strip passes between pinch rolls 69 and 70 and then through the shear frame between knives 29 and 30. Guide 71 ensures that the leading edge of the strip will pass between the knives and not fall to the base as it leaves the pinch rolls. When the shear is in the position shown in FIGURE 5, the strip passes beneath triangular deflector 33 along the lower strip pass line 67 between guides 64 and 65 to one of the mandrels upon which the strip is coiled.

When a full coil is wound, then the strip must be cut and diverted to another mandrel for winding.

When the strip is to be cut, motor 58 is driven to rotate crank shaft 47 one half of a revolution. Referring to FIGURE 4, as the crank shaft rotates, it rotates cam 50 forcing the shear frame toward the strip approach side (to the left) from the position shown in FIGURE 4. The three shear knives are confined within the shear frame and therefore move to the approach with it. Rotation of the crank shaft also causes connecting rods 56 to move down and connecting rods 53 to move up. Accordingly, the multiple knives 29 and 30 move upwardly and the single knife and triangular deflector 33 move downwardly. As the shear frame moves forward in the direction of the strip travel, the knives reciprocate until the knife at the edge of deflector 33 is aligned with the lower frame knife 30 and the opening for strip passage is above deflector 33. That action will, of course, cut the strip, and the oncoming strip is diverted to upper pass line 68. When the strip is to be cut again, crank shaft 47 is again rotated through one half of a revolution and the process is repeated except that the triangular deflector is again aligned with the upper shear knife 29 and the strip again follows lower pass line 67.

The operation of the embodiment shown in FIGURE 6 is identical to that described above, except that the shear frame is reciprocated by rotation of crankshaft 81 instead of the operation of cams 50 and springs 15.

While we have illustrated and described a present preferred embodiment of our invention, it is to be understood that we do not limit ourselves thereto and that our invention may be otherwise variously practiced within the scope of the following claims.

We claim:

1. Flying shear apparatus having a base, shear frame means pivotally mounted thereon for flying movement backwardly and forwardly, means yieldingly urging said shear frame means in one direction, cam means variably urging said shear frame means in the opposite direction, first knife means slidably mounted in said shear frame means, second knife means slidably mounted in said shear frame means and in cutting relationship to said first knife means, cam means associated with the first and second knife means and in operative connection therewith so constructed and arranged that motion of all said cam means relative to the shear frame means and knife means causes simultaneous flying action of the shear frame means and cutting motion of the respective knife means in opposite directions in the shear frame means.

2. Flying shear apparatus having a base, shear frame means pivotally mounted thereon for flying movement backwardly and forwardly in the direction of travel of the stock to be cut, means yieldingly urging said shear frame means in one direction, cam means engaging said shear frame means and variably moving it against said urging, first knife means slidably mounted in said shear frame means, second knife means slidably mounted in said shear frame means and in cutting relationship to said first knife means, cam means associated with the knife means and in operative connection therewith, cam means associated with the second knife means and in operative connection therewith, the cam means being so constructed and arranged that motion of all said cam means relative to the shear frame means and knife means causes simultaneous flying action of the shear frame means and reciprocating cutting motion of the respective knife means in opposite directions in the shear frame means.

3. Flying shear apparatus having a base, shear frame means pivotally mounted on the base for reciprocating movement backwardly and forwardly of the direction of travel of stock to be cut, cam follower means in operative connection with the shear frame means, multiple knife means slidably mounted in said shear frame means, cam follower means in operative connection therewith, second knife means slidably mounted in said shear frame means, cam follower means in operative connection therewith, cam means associated with all said cam follower means causing relative motion between the multiple knife means and the second knife means so constructed and arranged that motion of said cam means relative to the cam follower means of the shear frame means, multiple knife means and second knife means causes simultaneous reciprocation of the shear frame means and cutting motion of the knife respective means in opposite directions in the shear frame means.

4. Flying shear apparatus having a base, shear frame means pivotally mounted on the base for reciprocating movement backwardly and forwardly of the direction of travel of stock to be cut, cam follower means in operative connection with the shear frame means, multiple knife means slidably mounted in said shear frame means, cam follower means in operative connection therewith, second knife means slidably mounted in said shear frame means and arranged to register with the multiple knife means in cutting relationship when there is relative sliding movement between the multiple knife means and the second knife means, cam follower means in operative connection with the second knife means, cam means associated with the cam follower means in operative connection with the multiple knife means and the second knife means causing relative motion between the multiple knife means and the second knife means bringing the multiple knife means and the second knife means into register and so constructed and arranged that motion of all said cam means relative to the cam follower means associated with the shear frame means, multiple knife means and second knife means causes simultaneous reciprocation of the shear frame means and cutting motion of the respective knife means in opposite directions in the shear frame means.

5. Flying shear apparatus having a base, shear frame means pivotally mounted thereon for reciprocating movement backwardly and forwardly of the direction of travel of stock to be sheared, spring means yieldingly urging said shear frame means in one direction, cam follower means in operative connection with said shear frame means, first cam means engaging said cam follower means, first knife means comprising multiple spaced-apart horizontal knives slidably mounted in said shear frame means, cam follower means in operative connection therewith, second cam means engaging the cam follower means in operative connection with the first knife means, second knife means mounted for sliding movement relative to said shear frame means, cam follower means in operative connection therewith, third cam means engaging the cam follower means in operative connection with the second knife means and means driving all of said cam means so constructed and arranged that the shear frame means is caused to reciprocate and said second knife means successively comes in shearing relation with each of the multiple knives.

6. Flying shear apparatus having a base, shear frame means pivotally mounted thereon for reciprocating movement backwardly and forwardly of the direction of travel of stock to be sheared, spring means yieldingly urging said shear frame means in one direction, cam follower means in operative connection with said shear frame means, first cam means engaging said cam follower means, first knife means comprising multiple spaced apart horizontal knives slidably mounted in said shear frame means, cam follower means in operative connection therewith, second cam means engaging the cam follower means in operative connection with the first knife means, second knife means mounted for sliding movement relative to said shear frame means, cam follower means in operative connection therewith, third cam means engaging the cam follower means in operative connection with the second knife means, strip deflector means extending from one of said knife means in the direction in which stock issues from the shear and directing the issuing stock to one of a plurality of paths of stock travel and means driving all of said cam means so constructed and arranged that the shear frame means is caused to reciprocate and said second knife means alternately comes in shearing relation with one and then the other of the multiple spaced apart horizontal knives.

7. Flying shear apparatus having a base, means to feed strip toward the shear, a shear frame mounted on the base for reciprocating movement in the direction of travel of the stock to be cut, yielding means urging the shear frame in one direction, cam follower means rigidly connected to the shear frame, cam means engaging said cam follower means, multiple knife means comprising a plurality of spaced-apart knives slidably mounted for movement up and down relative to the shear frame, multiple knife cam follower means in operative connection therewith, multiple knife cam means engaging the multiple knife cam follower means, second knife means slidably mounted for movement up and down relative to the shear frame and to the multiple knife means and aligned to register with the multiple knife means in cutting relationship, second knife cam follower means in operative connection with the second knife means, second knife cam means engaging the second knife cam follower means, strip deflector means adjacent and slidable with the second knife means, strip guide means positioned at the exit side of the shear frame and defining a plurality of strip paths from the shear frame, cam shaft means operating all of said cam means simultaneously so constructed and arranged that the shear frame is caused to reciprocate, the second knife means is moved across a gap between the spaced-apart knives of the multiple knife means and registers with one thereof to cut stock passing through the shear and the deflector means is moved to deflect the advancing strip to a path defined by guide means different from that followed by the stock passing through the shear frame immediately before.

8. Flying shear apparatus having a base, shear frame means pivotally mounted thereon for flying movement backwardly and forwardly, means urging said shear frame means at one time in one direction and at another time in the opposite direction, first knife means slidably mounted in said shear frame means, second knife means slidably mounted in said shear frame means and in cutting relationship to said first knife means, cam means associated with the first and second knife means and in operative connection therewith so constructed and arranged that motion of all said cam means relative to the shear frame means and knife means causes simultaneous flying action of the shear frame means and cutting motion of the respective knife means in opposite directions in the shear frame means.

9. Flying shear apparatus having a base, shear frame means pivotally mounted thereon for flying movement backwardly and forwardly in the direction of travel of the stock to be cut, cam means in operative engagement with said shear frame means and variably moving it backwardly and forwardly, first knife means slidably mounted in said shear frame means, second knife means slidably mounted in said shear frame means and in cutting relationship to said first knife means, cam means associated with the first knife means and in operative connection therewith, cam means associated with the second knife means and in operative connection therewith, the cam means being so constructed and arranged that motion of all said cam means relative to the shear frame means and knife means causes simultaneous flying action of the shear frame means and reciprocating cutting motion of the respective knife means in opposite directions in the shear frame means.

References Cited by the Examiner
UNITED STATES PATENTS

| 1,901,910 | 3/33 | Johnson | 83—317 |
|---|---|---|---|
| 2,258,348 | 10/41 | Biggert | 83—578 |
| 2,843,202 | 7/58 | Hallden | 83—315 |

FOREIGN PATENTS

| 786,626 | 9/35 | France. |
|---|---|---|
| 368,149 | 2/39 | Italy. |

ANDREW R. JUHASZ, *Primary Examiner.*